Figure 1:
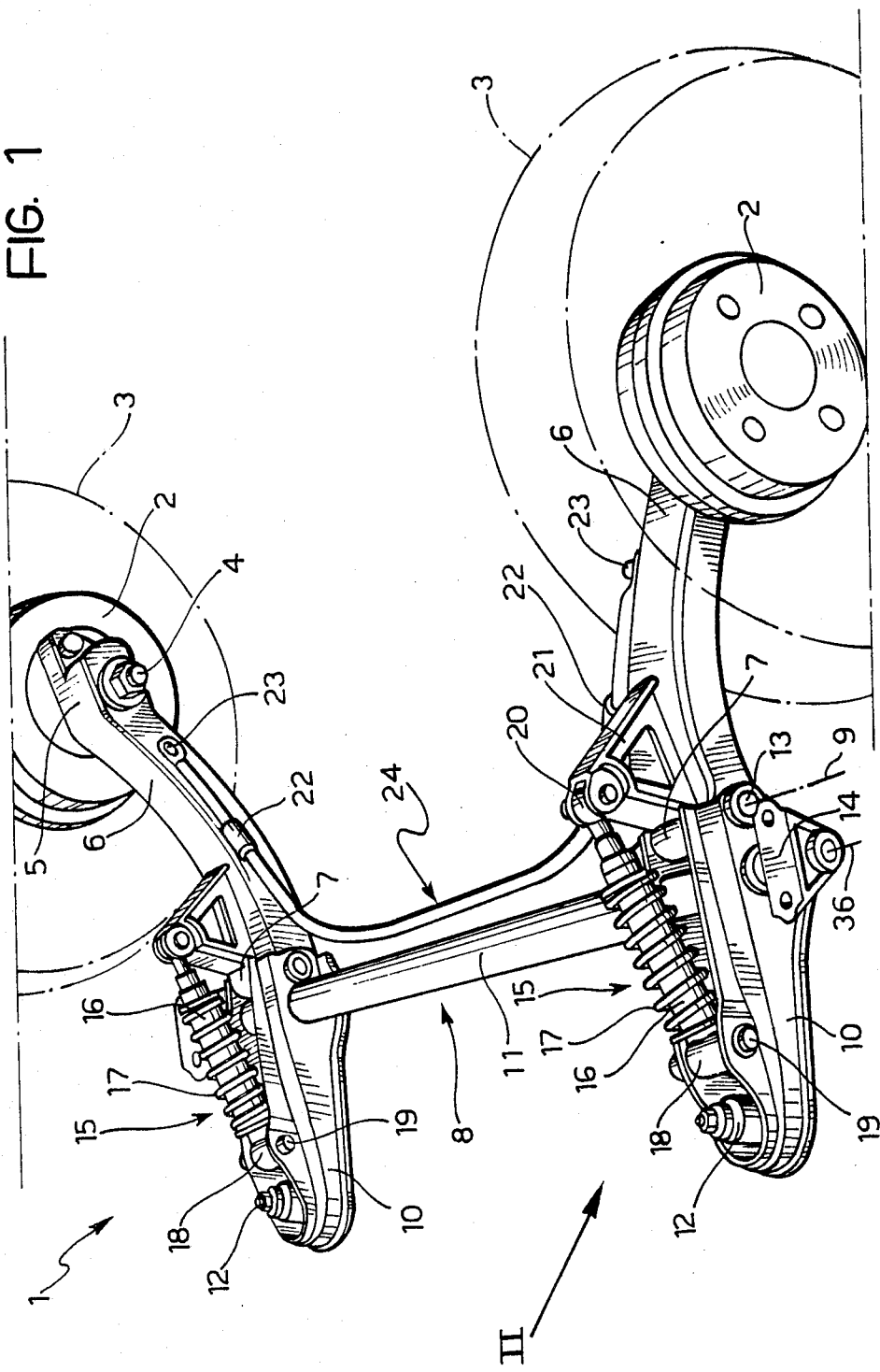

United States Patent [19]

Gandiglio

[11] Patent Number: 4,830,396
[45] Date of Patent: May 16, 1989

[54] REAR SUSPENSION FOR MOTOR VEHICLES

[75] Inventor: Romolo Gandiglio, Cambiano, Italy

[73] Assignee: Fiat Auto S.p.A., Turin, Italy

[21] Appl. No.: 216,599

[22] Filed: Jul. 7, 1988

[30] Foreign Application Priority Data

Jul. 7, 1987 [IT] Italy .................. 67584 A/87

[51] Int. Cl.$^4$ ................ B60G 3/14; B62D 21/11
[52] U.S. Cl. .................. 280/701; 280/689; 280/788; 280/724
[58] Field of Search .......... 280/724, 725, 726, 690, 280/696, 697, 698, 688, 675, 700, 701, 660, 663, 665, 666, 670, 672, 673, 788

[56] References Cited

U.S. PATENT DOCUMENTS 2,260,634 10/1941 Mullner .................. 280/724
4,140,333 2/1979 Thoraval et al. ......... 280/700
4,652,009 3/1987 Ando et al. ............. 280/701

FOREIGN PATENT DOCUMENTS 144618 11/1979 Japan .................. 280/690

*Primary Examiner*—Charles A. Marmor
*Assistant Examiner*—Karin Tyson
*Attorney, Agent, or Firm*—Sughrue, Mion, Zinn, Macpeak & Seas

[57] ABSTRACT

A rear suspension for motor vehicles comprising two longitudinal arms carrying the rear wheels of the motor vehicle at their rear ends, compression springs and a subframe. The front ends of the longitudinal arms are articulated to the subframe which is fixed to the body of the vehicle. The compression springs are interposed between each arm and the subframe so that the whole suspension can be assembled on the sub-frame before the latter is mounted on to the body. The subframe includes two sheet-metal box-section lateral supports provided with attachments for connecting the subframe to the body and for the articulation of the longitudinal arms. A sheet-metal cross member is rigidly connected at its ends to the two lateral supports. Each compression spring is interposed between and connected to a respective lateral support of the sub-frame. A bracket is rigidly connected to the respective longitudinal arm on an axis parallel to the longitudinal plane of symmetry of the motor vehicle and is substantially horizontal. The subframe cross member has a tubular configuration having an axis arranged in front of the axis of articulation of the longitudinal arm. The attachments which connect the subframe to the body include for each lateral support a first attachment provided on the front end of the lateral support for connection to the body of the motor vehicle and a second attachment connected to the lateral support outside of the lateral support on the axis of the tubular cross member.

2 Claims, 6 Drawing Sheets

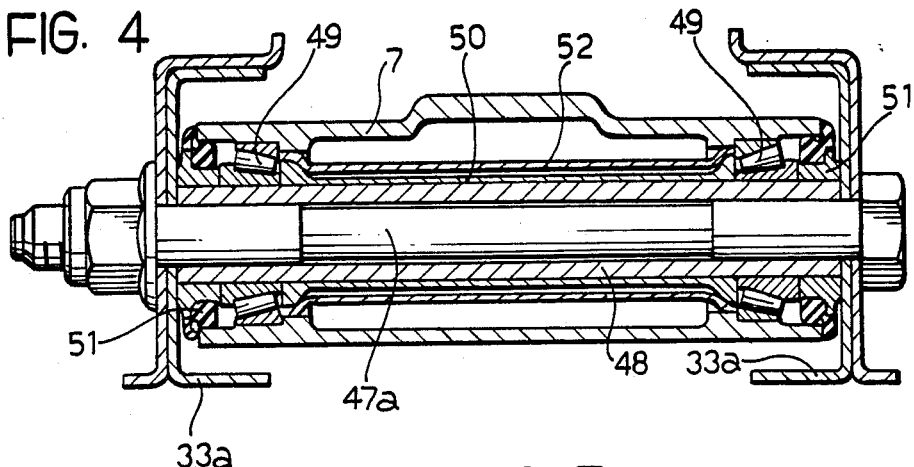
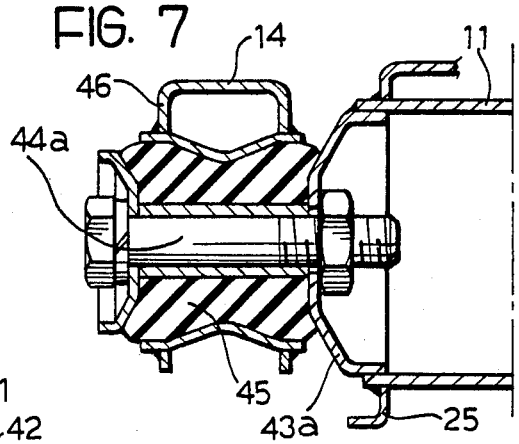
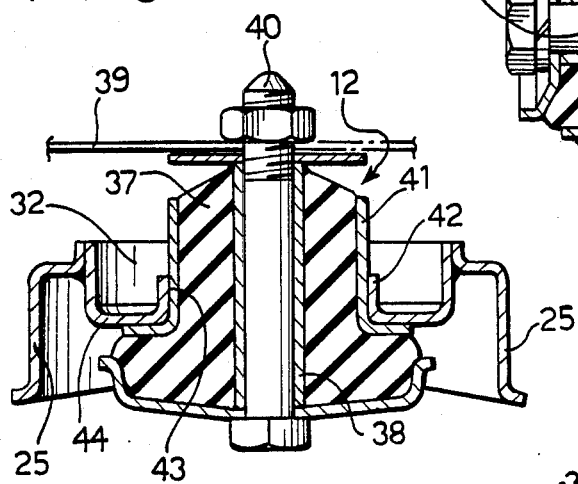
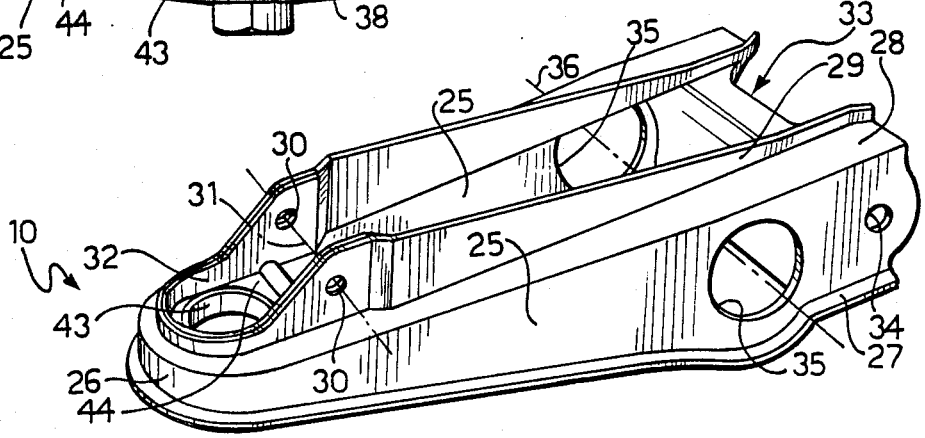

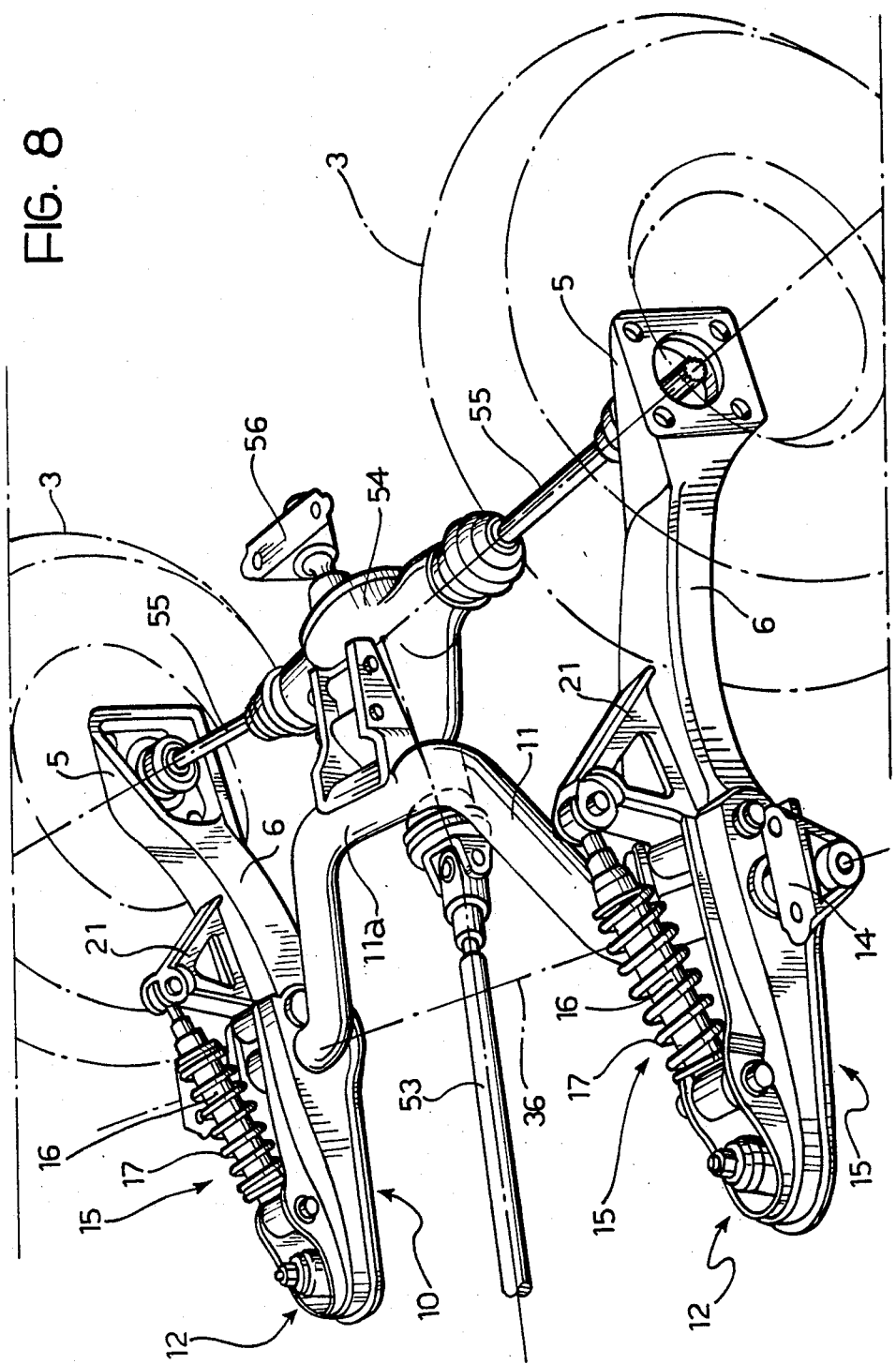

REAR SUSPENSION FOR MOTOR VEHICLES

The present invention relates to rear suspension for motor vehicles, of the type including two longitudinal arms articulated to the body of the motor vehicle at their front ends and carrying the rear wheels of the motor vehicle at their rear ends, with compression springs interposed between the longitudinal arms and the body, wherein the front ends 7 of the longitudinal arms 6 are articulated to a sub-frame 8 which is fixed to the body, and the compression springs 17, 150 are interposed between each arm 6 and the sub-frame 8, so that the whole suspension can be assembled on the sub-frame 8 before the latter is mounted on to the body, wherein the sub-frame includes two sheet-metal box-section supports 10 provided with attachments 12, 14 for fixing to the body at its two sides and carrying the supports 49 for the articulation of the longitudinal arms, and a sheet-metal cross member 11 rigidly connected at its ends to the two lateral supports 10, and wherein each compression spring 17, 150 is interposed between a respective lateral support 10 of the sub-frame 8 and a bracket 21 connected rigidly to the respective longitudinal arm 6, on an axis parallel to the longitudinal plane of symmetry of the motor vehicle and substantially horizontal.

A suspension of the type above specified is described in the French patent application No. FR-A-2,314,069.

The object of the present invention is to produce a rear suspension of the type specified above, which is simple and economical to construct, which can be mounted rapidly on the body, even by robots, and which at the same time ensures the necessary comfort for the passengers.

In order to achieve this object, the subject of the invention is a rear suspension for motor vehicles of the type specified above, characterised in that said sub-frame cross member 11 has a tubular configuration, the axis of such tubular cross member 11 being arranged in front of the axis of articulation of the longitudinal arms 6, and in that each lateral support has a first attachment 12 arranged in correspondence with the front end of the lateral support 10 for connection to the body of the motor vehicle, and a second attachment 14 arranged outside the lateral support 10 on the axis 36 of the tubular cross member 11.

Thus, the entire unit constituted by the sub-frame and the various elements mounted thereon can be mounted easily on the body in a single operation, perhaps even by means of robots.

The longitudinal arms are articulated to the two lateral supports of the sub-frame about a common axis perpendicular to the longitudinal plane of symmetry of the vehicle and—relative to the direction of forward movement of the motor vehicle—behind the axis of the tubular cross member forming part of the sub-frame. In this way, the stresses transmitted by each rear wheel to the respective longitudinal arm when the vehicle is moving are transmitted in turn to the support for the articulation of the longitudinal arm and, through this, to the respective lateral support of the sub-frame and to the tubular cross member, which is subjected to bending stress.

Each compression spring (which may consist of a helical spring mounted coaxially on a hydraulic shock-absorber, or of a hydropneumatic cylinder) is arranged with its axis substantially horizontal and has its front end connected to the respective lateral support of the sub-framce and its rear end connected to a bracket which, in turn, is connected rigidly to the respective longitudinal arm. This arrangement has advantages from the point of view of the bulk of the suspension and also enables the desired variation in the flexibility of the suspension to be obtained with variations in the load of the motor vehicle. In particular, the flexibility of the suspension decreases with increases in load, to the benefit of the comfort of the ride. This variation in flexibility is due to the fact that the lever arm with which the spring acts relative to the axis of articulation of the longitudinal arm varies as the position of the longitudinal arm varies.

If the suspension is used for driven rear wheels, the tubular cross member of the sub-frame can also be used conveniently to support the rear differential of the motor vehicle. In this case, the tubular cross member has a curved configuration so that its central part is situated behind and above the axis defined by the ends of the cross member.

Figure 2:
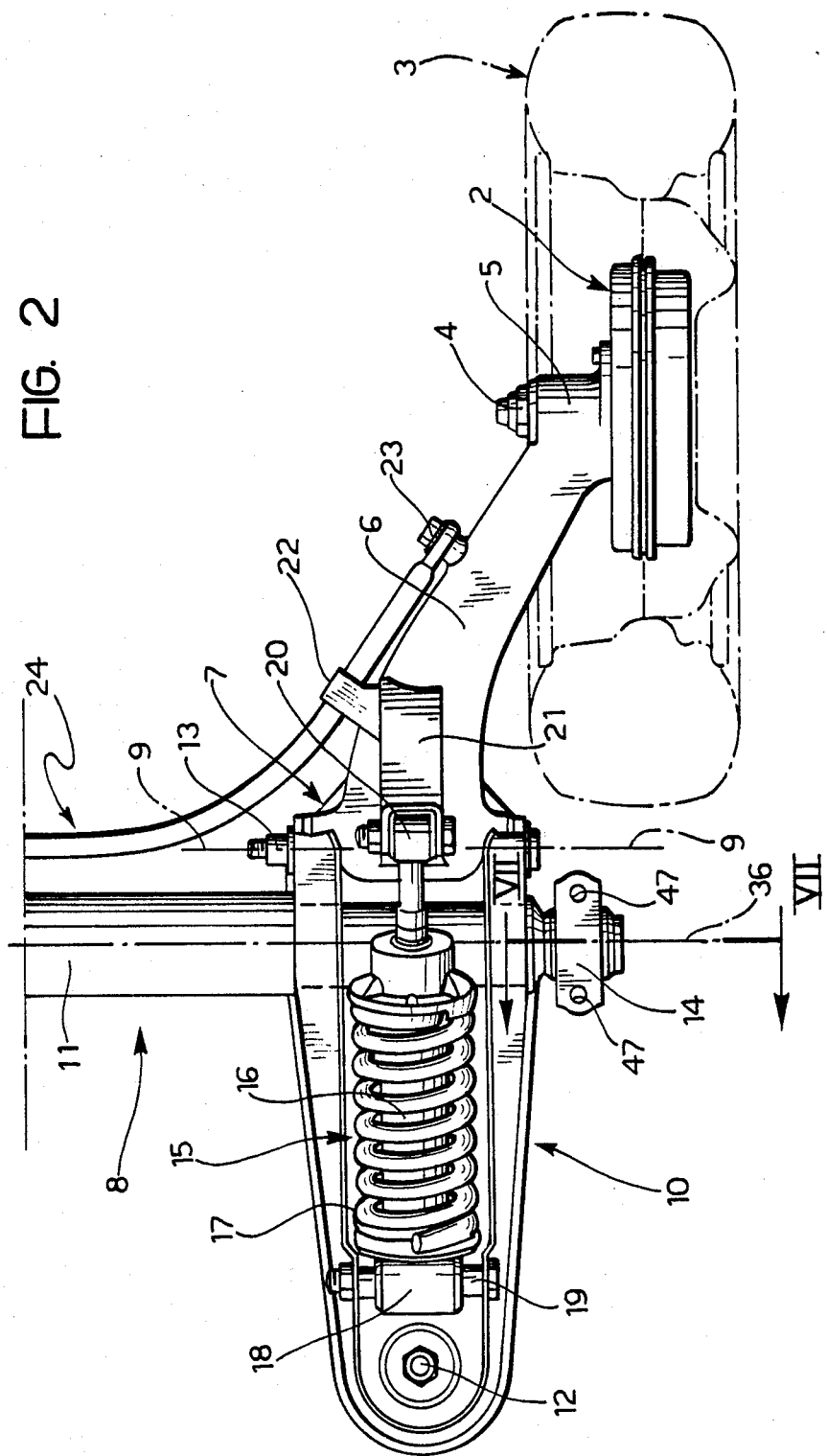
Figure 3:
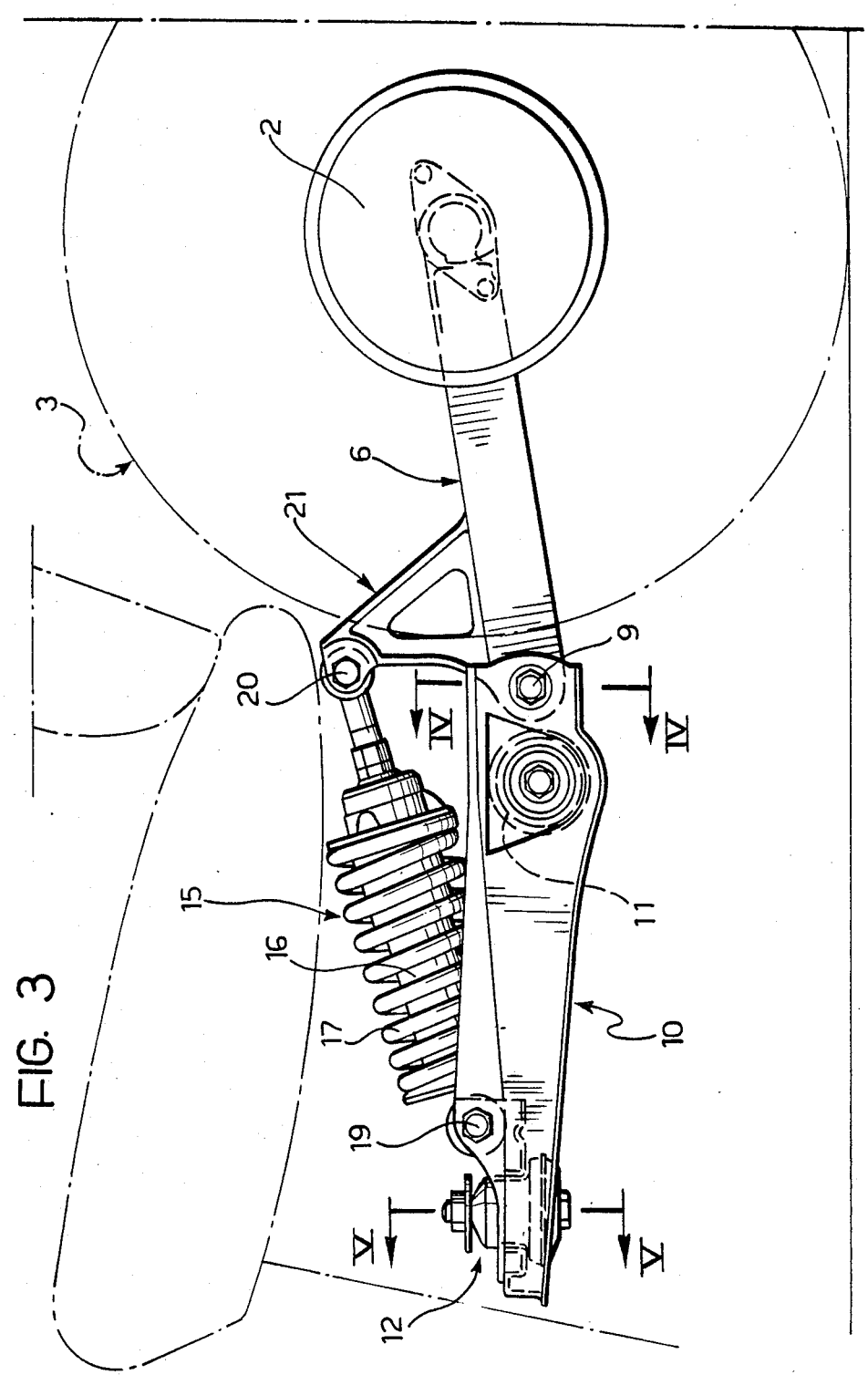
Figure 9:
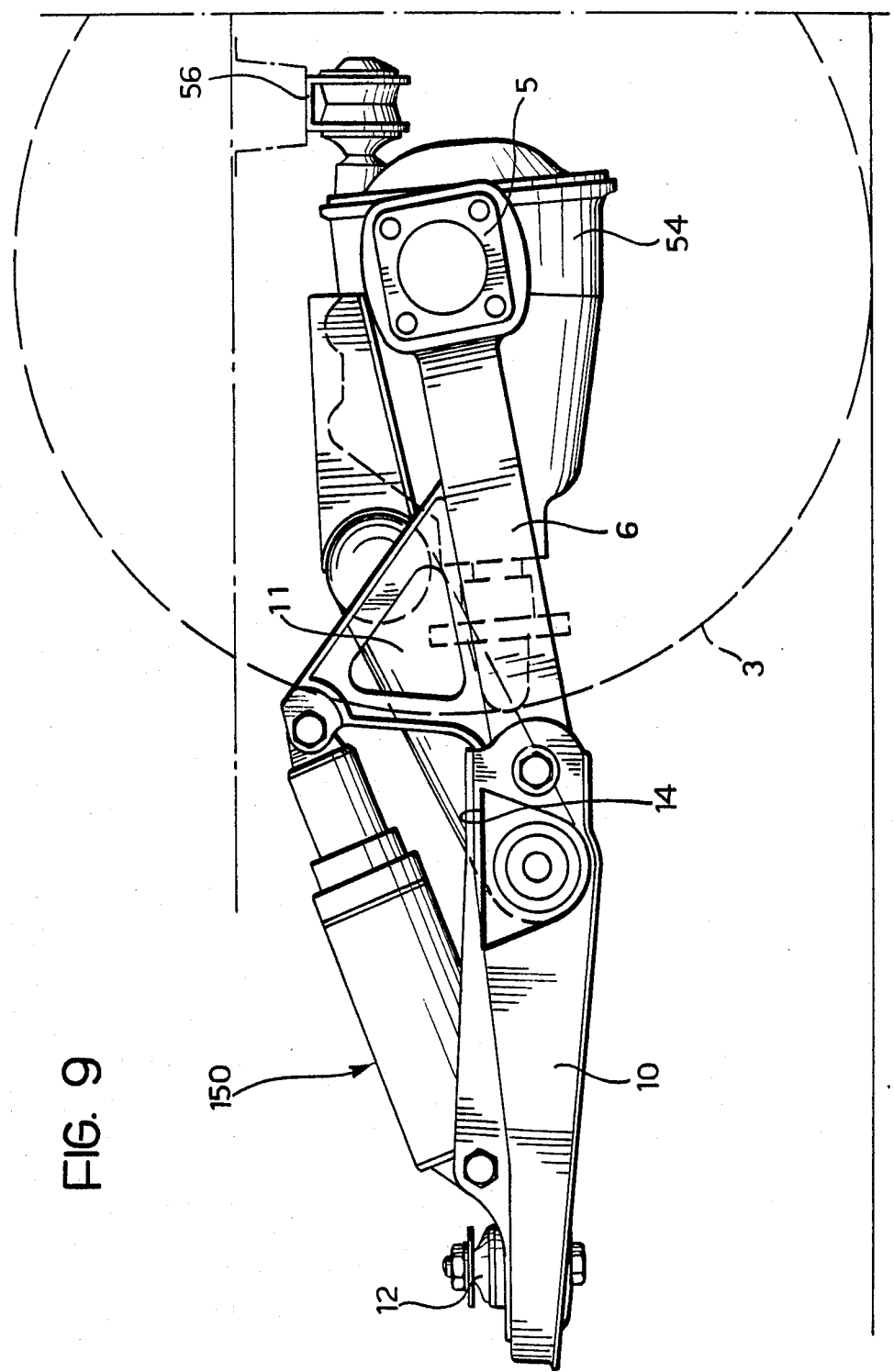

Further characteristics and advantages of the present invention will be clear from the description which follows with reference to the appended drawings, provided purely by way of non-limiting example, in which:

FIG. 1 is a perspective view of a first embodiment of the suspension according to the invention, FIG. 2 is a plan view of the part indicated II in FIG. 1, FIG. 3 is a side elevational view of the suspension of FIG. 1, FIGS. 4 and 5 illustrate sections taken on the lines IV and V of FIG. 3, FIG. 6 is a perspective view of a detail of the suspension of FIG. 1 on enlarged scale, FIG. 7 is a section taken on the line VII of FIG. 2, FIG. 8 is a perspective view of a second embodiment of the suspension according to the invention, and FIG. 9 is a side elevational view of a variant of the suspension illustrated in FIG. 7.

In FIGS. 1 to 3, a rear suspension for a front-wheel drive motor vehicle, generally indicated 1, has mountings 2 for the rear wheels 3 fixed by means of bolts 4 to the rear ends 5 of two longitudinal arms 6, each having a hollow body produced by casting. The front ends of the longitudinal arms 6 form bushes 7 which are articulated to a sub-frame 8 about a common axis 9 perpendicular to the longitudinal plane of symmetry of the motor vehicle. The sub-frame 8, which is intended to be fixed to the body of the motor vehicle, comprises two sheet-metal box-section supports indicated 10, connected to each other by a tubular sheet-metal cross member 11. The axis 36 of the tubular cross member 11 is arranged immediately in front of the articulation axis 9 of the longitudinal arms 6. Each lateral support 10 is provided at its forward end with an attachment 12 for connection to the body of the motor vehicle and carries at its rear end a pin 13 for the articulation of the respective longitudinal arm, as will be described in greater detail below. Each lateral support 10 has a further attachment 14 for fixing to the body of the motor vehicle, arranged adjacent the outer side of the support 10 on the axis of the tubular cross member 11.

In the case of the embodiment illustrated in FIG. 1, two units 15 each consisting of a hydraulic shock-absorber 16 and a compression spring 17 mounted coaxially on the shock-absorber 16, are interposed between the longitudinal arms 6 and the sub-frame. Each unit 15 has a front end 18 articulated by means of a pin 19 to the lateral support 10, behind its front attachment 12. The rear end 20 of the unit 15, on the other hand, is articulated to a bracket 21 which, in turn, is welded onto the respective longitudinal arm 6, in such a way that the axis of the unit 15 is arranged parallel to the longitudinal plane of symmetry of the vehicle, substantially horizontally, that is, much nearer the horizontal than the vertical. Finally, the end portions of a stabilizer torsion bar 24 are fixed to the two horizontal arms 6 by means of attachments 22, 23.

The conformation of each lateral support 10 will be described in detail below with reference to FIGS. 2 to 6. Each support 10 comprises a sheet-metal element bent into a U so as to define two side walls 25 and a front wall 26. As can clearly be seen in FIG. 6, the sheet-metal element has a lower edge 27 bent in the horizontal plane and an upper edge which is also bent over so as to define a horizontal surface 28 with a vertical flange 29. The height of the flange 29 increases from the rear end of the support 10 to the point of attachment of the spring-shock-absorber unit 15, which consists of two holes 30 formed in the flange 29 and arranged on a transverse axis 31. The height of the flange 29 decreases towards the front as far as the end of the front wall 26. In this section, the flange 29 is strengthened by a reinforcing element 32 welded to the part 29 and having a base part 44 with a hole 43. A rear wall of the support 10 is indicated 33 and consists of a sheet-metal element having two lateral tabs 33a welded to the inside of the two walls 25. Two holes 34 (one of which is visible in FIG. 6) are formed in the two lateral walls thus reinforced, for the passage of the articulation pin of the longitudinal arm, as will be explained in detail below. In front of the wall 33, the two lateral walls 25 have two holes 35 having a common transverse axis 36, for the connection of the tubular cross member 11.

As shown in FIG. 5, each attachment 12 comprises a hollow body 37 of elastomeric material whose inner surface is connected to a tubular metal element 38 fixable to a part 39 of the body of the motor vehicle by means of a bolt 40. The outer surface of the tubular elastomeric body 37 is rigidly connected to a tubular metal element 41 which is fixed by means of welding within the rim 42 of the hole 43 formed in the base wall 44 of the reinforcing element 32.

With reference to FIG. 7, the end portion of the tubular cross member 11 is engaged within the holes 35 and welded to the two walls 25. A sheet-metal cover 43a is fixed by welding to the outer end of the tubular cross member 11 and, in turn, carries, by means of a bolt 44a and a tubular body 45 of elastomeric material, a sheet-metal bracket which constitutes the attachment 14 and has holes 47 (FIG. 2) for the engagement of bolts for fixing to the body.

In the two holes 34 formed at the rear ends of the two sides 25 of the support 10 is mounted a bolt 47a which supports a metal bush 48 constituting the articulation pin of the longitudinal arm. The front bush 7 of each arm is rotatably mounted on the bus 48 with the interposition of two tapered roller bearings 49. The inner rings of the two bearings 49 are keyed to the bush 48 and are kept apart by a tubular spacer 50. A sealing ring 51 is also interposed between the inner ring of each bearing and the wall 33a nearest to it, in order to prevent leakage of the lubricant of the bearings. Finally, a tubular sealing element 52 is interposed between the tubular spacer 50 and the bush 7 of the longitudinal arm.

The above-described suspension has various advantages. In the first place, the longitudinal arms 6 and the spring-shock-absorbers 15 can be assembled on the sub-frame 8 so as to constitute a single unit which can then be mounted rapidly and easily on the body. The suspension unit is therefore assembled outside the main assembly line of the motor vehicle. Moreover, its mounting on the body may be carried out by automatic assembly systems, for example, by means of robots.

The horizontal arrangement of the springs of the suspension according to the invention has advantages from the point of view of vertical bulk. Furthermore, the lever arm with which the spring acts relative to the articulation axis 9 of the longitudinal arms varies as the angular position of the respective arm varies. In this way, increases in the flexibility of the suspension with reductions in the load of the vehicle can be obtained without expensive complications, to the benefit of the comfort of the ride.

The structure of the suspension is of simple and economical construction and at the same time can resist the various stresses which occur during use of the vehicle. In particular, the transverse and longitudinal forces which act on each wheel on bends, during braking, or during acceleration are transmitted through the bearings 49 to the respective lateral support 10 and, through this, to the tubular cross member 11, which is subjected to bending stress.

FIG. 8 is a variant of FIG. 1 which relates to a motor vehicle with four-wheel drive. The only difference compared with the embodiment described above consists in the fact that the tubular cross member 11 has a curved conformation in this case, so that its central part 11a is behind and above the axis 36 defined by the ends of the cross member. This avoids interference between the cross member 11 and the propeller shaft 53 of the motor vehicle which carries the drive to the members of the rear differential 54. The central part 11a of the cross member 11 is also used to support the rear differential 54, whose half-shafts 55 are connected to the rear wheels by universal joints in correspondence with the rear ends of the longitudinal arms. The differential 54 is also provided with an attachment 56 for fixing directly to the body of the motor vehicle.

FIG. 9 shows a variant of FIG. 8, in which the spring-shock-absorber unit 15 has been replaced by a hydropneumatic unit 150. Clearly, this solution could also be used in the case of the embodiment of FIG. 1.

A further advantage of the suspension according to the invention lies in the fact that the whole structure of the sub-frame 8 for supporting the suspension extends in front of the articulation axis 9 of the longitudinal arms. In particular, the attachments 12, 14 of the sub-frame 8 are all arranged in front of the axis 9. Thus, the stresses transmitted from the wheels are transferred to the body in correspondence with the part situated in front of the rear wheels, that is, the strongest part.

Naturally, the principle of the invention remaining the same, the details of construction and forms of embodiment may be varied widely with respect to those described and illustrated purely by way of example, without thereby departing from the scope of the present invention.

I claim:

1. A rear suspension for motor vehicles comprising two longitudinal arms (6) carrying the rear wheels (3) of the motor vehicle at their rear ends, compression springs (17, 150) and a subframe, wherein the front ends (7) of the longitudinal arms (6) are articulated to the subframe (8) which is fixed to the body, and the compression springs (17, 150) are interposed between each arm (6) and the subframe (8), so that the whole suspension can be assembled on the sub-frame (8) before the latter is mounted on to the body, wherein the subframe includes two sheet-metal box-section lateral supports (10) provided with attachments (12, 13, 14) for connecting the subframe to the body and for the articulation of the longitudinal arms, and a sheet-metal cross member (11) rigidly connected at its ends to the two lateral supports (10), and wherein each compression spring (17, 150) is interposed between and connected to a respective lateral support (10) of the sub-frame (8) and a bracket (21) connected rigidly to the respective longitudinal arm (6), on an axis parallel to the longitudinal plane of symmetry of the motor vehicle and substantially horizontal, wherein said sub-frame cross member (11) has a tubular configuration, the axis of such tubular cross member (11) being arranged in front of the axis of articulation of the longitudinal arms (6) and in that the attachments (12, 14) connecting the subframe to the body include for each lateral support a first attachment (12) provided on the front end of the lateral support (10) for connection to the body of the motor vehicle, and a second attachment (14) connected to the lateral support outside of the lateral support (10) on the axis (36) of the tubular cross member (11).

2. A suspension according to claim 1, for a motor vehicle with a rear-wheel drive, wherein the tubular cross member (11) has a curved configuration with its central part (11a) behind and above the axis (36) defined by the ends of the cross member, the central part (11a) being usable for supporting the rear differential of the motor vehicle.

* * * * *